United States Patent
Fountoulakis et al.

(10) Patent No.: US 10,407,751 B2
(45) Date of Patent: Sep. 10, 2019

(54) MULTIPURPOSE PROCESSING LINE FOR HEAT TREATING AND HOT DIP COATING A STEEL STRIP

(71) Applicant: ArcelorMittal, Luxembourg (LU)

(72) Inventors: Stavros Fountoulakis, Schererville, IN (US); Jean Philippe Masse, Grenoble (FR); Dongwei Fan, East Chicago, IN (US)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 15/323,258

(22) PCT Filed: Jul. 3, 2015

(86) PCT No.: PCT/IB2015/055032
§ 371 (c)(1),
(2) Date: Dec. 30, 2016

(87) PCT Pub. No.: WO2016/001888
PCT Pub. Date: Jan. 7, 2016

(65) Prior Publication Data
US 2017/0152581 A1    Jun. 1, 2017

(30) Foreign Application Priority Data

Jul. 3, 2014   (WO) .................. PCT/IB2014/002259
Aug. 26, 2014  (WO) .................. PCT/IB2014/003263

(51) Int. Cl.
*C21D 9/573* (2006.01)
*B05C 9/10* (2006.01)
(Continued)

(52) U.S. Cl.
CPC ............... *C21D 9/573* (2013.01); *B05C 9/10* (2013.01); *B05C 9/12* (2013.01); *B05C 9/14* (2013.01);
(Continued)

(58) Field of Classification Search
CPC . C21D 9/573; C21D 9/60; C21D 1/00; C21D 1/70; C23C 2/285; C23C 2/02;
(Continued)

(56) References Cited

U.S. PATENT DOCUMENTS 5,798,007 A * 8/1998 Boyer .................... C21D 9/561
148/627
2010/0237548 A1    9/2010 Okada et al.
(Continued)

FOREIGN PATENT DOCUMENTS

CN        200971379 Y      11/2007
CN        101532118 A       9/2009
(Continued)

OTHER PUBLICATIONS

Foejer C et al: "Industrial Production of Quenching and Partitioning Steel", 2013 Intl. Symposium on New Developments in AHSS, Jan. 1, 2013, pp. 167-174.
(Continued)

*Primary Examiner* — Laura Edwards
(74) *Attorney, Agent, or Firm* — Davidson, Davidson & Kappel, LLC

(57) ABSTRACT

A multipurpose continuous processing line able for heat treating and hot dip coating a steel strip containing:
an annealing section (1) for heating the steel strip to a predetermined annealing temperature and for maintaining the steel strip at said annealing temperature,
a first transfer section (2),
an overaging section (3) able to maintain the temperature of the steel strip between 300° C. and 700° C.,
a second transfer section (4) able to adjust the temperature of the steel strip to allow the hot dip coating of the strip and,
a hot dip coating section (5),
wherein the first transfer section (2) includes, in sequence, a cooling section (21) and a heating section (22).

11 Claims, 2 Drawing Sheets

Figure 1:
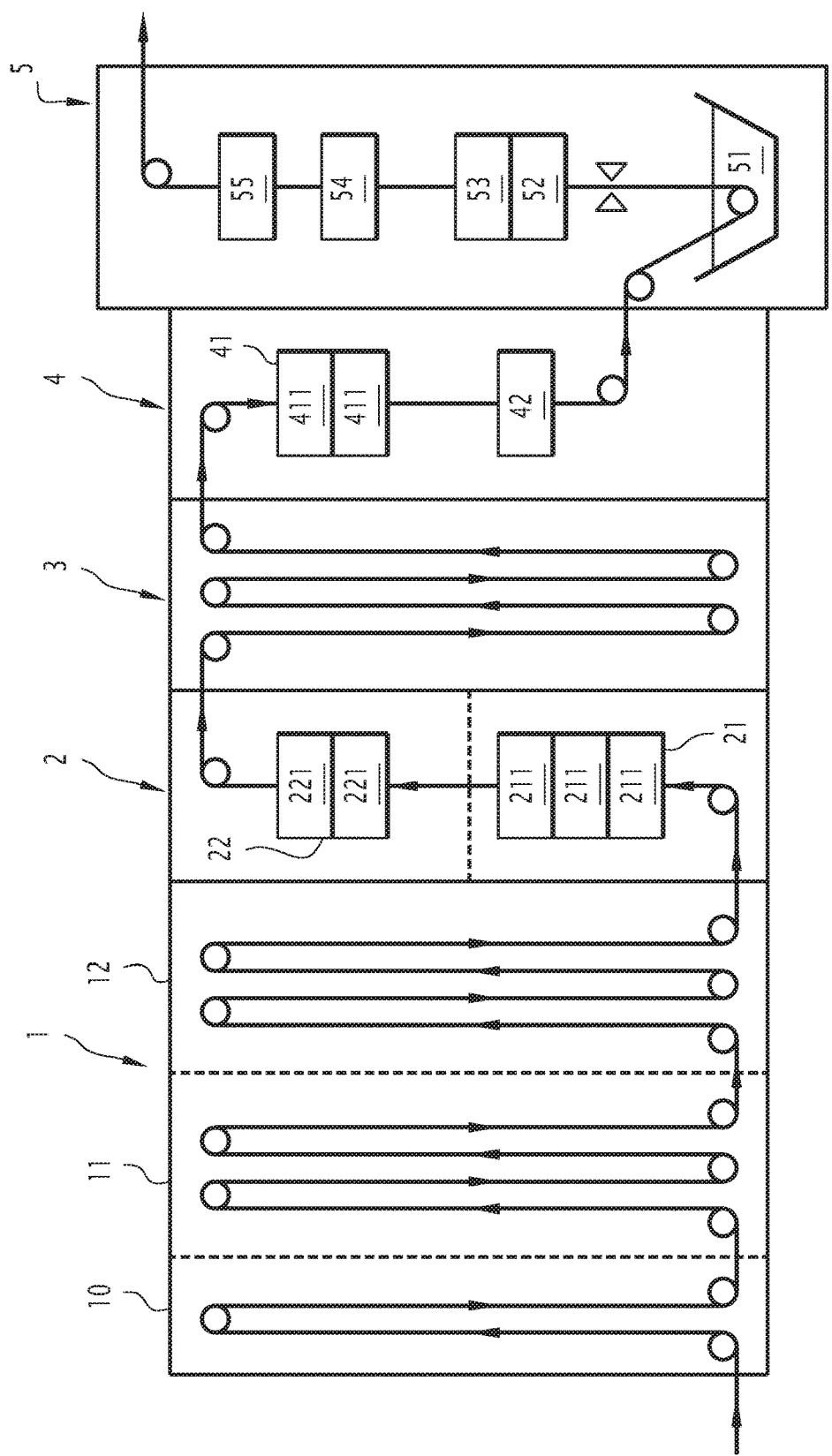

(51) Int. Cl.
*B05C 9/12* (2006.01)
*B05C 9/14* (2006.01)
*C23C 2/00* (2006.01)
*C23C 2/02* (2006.01)
*C23C 2/06* (2006.01)
*C23C 2/40* (2006.01)
*C21D 9/60* (2006.01)
*C23C 2/28* (2006.01)
*B05C 3/12* (2006.01)

(52) U.S. Cl.
CPC ............... *C21D 9/60* (2013.01); *C23C 2/003* (2013.01); *C23C 2/02* (2013.01); *C23C 2/06* (2013.01); *C23C 2/285* (2013.01); *C23C 2/40* (2013.01); *B05C 3/125* (2013.01); *C23C 2/28* (2013.01); *Y02P 10/253* (2015.11)

(58) Field of Classification Search
CPC .. C23C 2/003; C23C 2/06; C23C 2/40; C23C 2/28; B05C 3/125; B05C 9/10; B05C 9/12; B05C 9/14; C22C 18/00; C22C 38/00; Y02P 10/253
USPC ........ 118/419, 72, 73, 67–69; 148/242, 714, 148/639
See application file for complete search history.

(56) References Cited

U.S. PATENT DOCUMENTS

| | | |
|---|---|---|
| 2011/0252894 A1 | 10/2011 | Park et al. |
| 2014/0147697 A1 | 5/2014 | Berkhout et al. |
| 2016/0355903 A1 | 12/2016 | Kwak et al. |

FOREIGN PATENT DOCUMENTS

| | | |
|---|---|---|
| CN | 101812578 A | 8/2010 |
| EP | 0406619 A1 | 1/1991 |
| EP | 0688884 A1 | 12/1995 |
| EP | 2103715 A1 | 9/2009 |
| EP | 2546382 A1 | 1/2013 |
| FR | 2919876 A1 | 2/2009 |
| JP | 2012514131 A | 6/2012 |
| KR | 20150075311 A | 7/2015 |
| RU | 2424331 C2 | 7/2011 |
| WO | 2004022794 A1 | 3/2004 |
| WO | 2010097038 A1 | 9/2010 |
| WO | 2013010968 A1 | 1/2013 |
| WO | 2015099402 A1 | 7/2015 |

OTHER PUBLICATIONS

"Baoshan Iron & Steel Co Sustainable Steel Solutions for Chinese Cars Contents", Nov. 21, 2013, Retrieved from Internet : URL:https://www.worldsteel.org/dms/internetDocumentList/downloads/steel-by-topic/Automotive-Conference-2013/13--Sustainable-steel-solutions-for-chinese-cars--Gao-Yongsheng/document/13. Sustainable Steel Solutions for Chinese Cars- Gao Yongsheng.pdf [retrieved on Sep. 18, 2015], pp. 10-13.

"BaoSteel Automotive Advanced High Strength Steels", Sep. 10, 2013, Retrieved from Internet: URL:http://tv.baosteel.com/web/plc/p-pdf/automotive_advanced_high_strength_steel_en.pdf. [retrieved on Sep. 18, 2015], pp. 2,4-7.

Eansor T J: "DNN's Continuous Hot Dip Galvanizing Line", Aise Steel Technology, Aise, Pittsburg, PA, US, vol. 71, No. 6, Jun. 1, 1994, pp. 38-40.

\* cited by examiner

MULTIPURPOSE PROCESSING LINE FOR HEAT TREATING AND HOT DIP COATING A STEEL STRIP

The present invention is related to a multipurpose processing line for heat treating and hot dip coating a steel strip.

To manufacture various types of structural members and body panels for automobiles, it is common practice to use galvanized or galvannealed sheets made of DP (dual phase) steels or TRIP (transformation induced plasticity) steels. More recently, it was proposed to use also Q&P (quenching and partitioning) steels. Such sheets are produced in the form of strips on continuous processing lines such as continuous annealing lines coupled with coating facilities. But, due to the heat treatments required to manufactures these steel sheets and which treatments are different for DP steels, TRIP steels and Q&P steels, these steel sheets are produced on dedicated lines.

Thereby, the production of the various qualities of such steel sheets needs a plurality of lines which are very costly.

In order to reduce the investment costs, it is desirable to be able to produce DP, TRIP or Q&P steels on the same equipment.

For this purpose, the present invention is related to a multipurpose continuous processing line able for heat treating and hot dip coating a steel strip comprising:
- an annealing section for heating the steel strip to a predetermined annealing temperature and for maintaining the steel strip at said annealing temperature,
- a first transfer section,
- an overaging section able to maintain the temperature of the steel strip between 300° C. and 700° C.,
- a second transfer section able to adjust the temperature of the steel strip to allow the hot dip coating of the strip and,
- a hot dip coating section, wherein the first transfer section comprises, in sequence, cooling means and heating means.

According to other advantageous aspects of the invention, the multipurpose processing line comprises one or more of the following features, considered alone or according to any technically possible combination:
- the cooling means of the first transfer section are controllable such that their cooling capabilities are adjustable between no cooling and rapid cooling to a predetermined quenching temperature and the heating means of the first transfer section are controllable such that their heating capabilities are adjustable between no heating and rapid heating to a predetermined overaging temperature;
- the cooling means of the first transfer section are such that the cooling speed can be adjusted between 0° C./s and at least 70° C./s and the quenching temperature can be chosen between 100° C. and 500° C.;
- the heating means of the first transfer section comprise at least one controllable induction heater;
- the second transfer section comprises, in sequence, controllable cooling means and controllable heating means for adjusting the temperature of the strip by cooling or by heating;
- the second transfer section comprises controllable cooling means able to cool a sheet having a thickness up to 2 mm from a temperature between 550° C. and 700° C. to a hot deep coating temperature at a cooling speed which is preferably of at least 50° C./s;
- the overaging section comprises controllable means able to maintain the temperature of the strip around an overaging temperature or to allow the temperature of the strip to decrease slowly between an entry temperature and an exit temperature.
- the annealing section comprises controllable means such that the predetermined annealing temperature can be chosen between 700° C. and 1000° C.;
- the hot dip coating section comprises at least a liquid metal bath;
- the hot dip coating section further comprises alloying means for the coating;
- the hot dip coating section is a galvanizing section or a galvannealing section.

Figure 2:
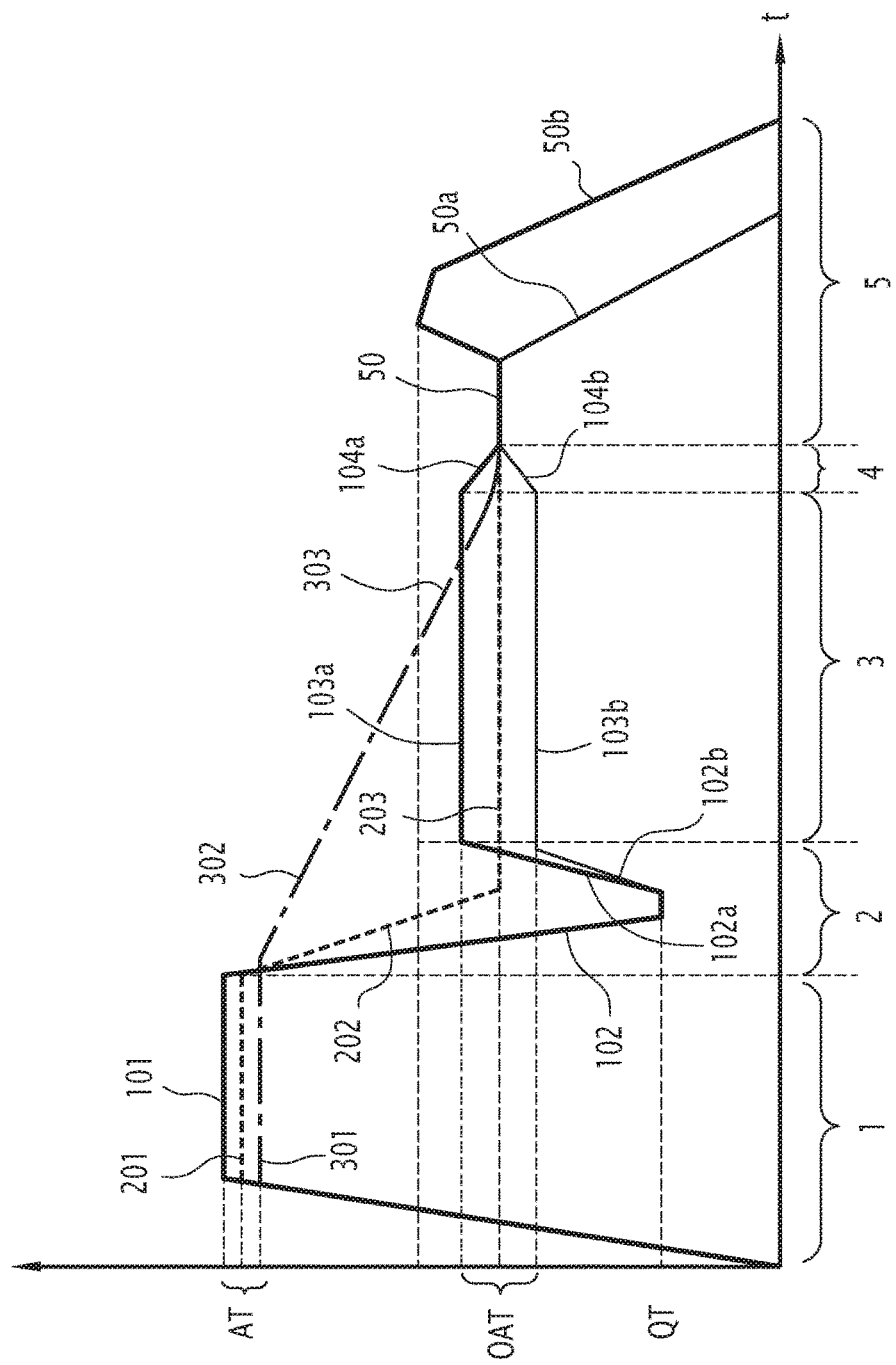

The invention will now be described in details but without limitations in view of the figures in which:

FIG. 1 is a schematic view of a continuous processing line according to the invention, FIG. 2 schematically shows the temperature versus time diagrams corresponding to the various thermal paths in processing that can be performed on a line according to the invention.

As shown in FIG. 1, the multipurpose continuous processing line comprises an annealing section 1, a first transfer section 2, an overaging section 3, a second transfer section 4 and a hot dip coating section 5, in which a steel strip runs as indicated by the arrows.

The annealing section 1 comprises a preheating zone 10, a heating zone 11 and a soaking zone 12, which are able to heat the strip from the ambient temperature to a predetermined annealing temperature AT which is comprised between 700° C. and 1000° C.

This annealing temperature must be chosen according to the type of sheets which are produced i.e. between about 750° C. and 840° C. for the DP steels, between about 830° C. and 860° C. for the TRIP steels and between about 790° C. and 950° C. for the Q&P steels.

For this purpose, the preheating and heating zones comprise controllable heating means known by those which are skilled in the art.

In the soaking zone, the strip has to be maintained at the annealing temperature or about at this temperature i.e. preferably between the annealing temperature −10° C. and the annealing temperature +10° C., for a time of preferably at least 45 s, preferably under a protective atmosphere. For this purpose, the soaking zone consists of a soaking furnace known per se, which length is adapted to maintain the temperature at least during the minimal required time, given the traveling speed of the strip.

The first transfer section 2, comprises at least, in sequence, first, cooling means 21, then heating means 22.

The cooling means 21, which can consist of a plurality of cooling boxes 211 known per se, is controllable between no cooling to a maximum cooling efficiency, in order to be able to cool the strip at an adjustable cooling rate to a predetermined quenching temperature or not to cool the strip. The cooling rate and the quenching temperature must be chosen according to the type of steel sheet which is produced. For example, for sheets made of DP steels, the strip has not to be cooled in the first transfer section, it has only to be able to cool naturally to an entry temperature into the overaging section. For sheets made of TRIP steels, the strip has to be cooled at a cooling speed around 25° C./sec for example, to an overaging temperature OAT of about 450° C. for example. For sheets made of Q&P steels, the strip has to be quenched at a cooling speed of at least 40° C./s, preferably at least 50° C./s, to a quenching temperature QT adjustable between 100° C. and 370° C., preferably between 140° C.

and 355° C., for example. The maximum difference between the annealing temperature and the quenching temperature is preferably less than 650° C.

For this purpose, the cooling means 21 have to be such that the cooling speed of a strip can be adjusted between 0° C./s and about 70° C./s and such that the quenching temperature can be adjusted between 100° C. and 500° C.

Preferably, the strip is maintained at the quenching temperature for about 1 to 2 seconds before to be reheated, although up to 10 s has no adverse effect.

If the cooling means 21 consist of a plurality of cooling boxes 211, these cooling boxes are preferably independently controllable.

The cooling boxes 211 are, for example, blowing boxes known per se able to blow on the strip air, gas or a mixture of air or gas and water.

The heating means 22 which can consist for example of one induction coil 221 able to be supplied by a power of 4.0 MW, or two induction coils each able to supply power of 4.0 W, for a higher capacity line, and have to be controllable in order to heat rapidly the strips to a predetermined overaging temperature if the sheets are made of Q&P steels or not to heat the strip, if the sheets are made of DP or TRIP steels.

For the Q&P steels, the overaging temperature is generally between 340° C. and 490° C., preferably between 350° C. and 480° C.

The overaging section 3 is a soaking furnace comprising known controllable means able to maintain the temperature of the strip at the predetermined overaging temperature between 300° C. and 700° C., preferably between 340° C. and 480° C. which is about the temperature at which the strip is introduced in the overaging section at the output of the first transfer section. But, this section is also able to not maintain the temperature but is able to allow it to steadily decrease down to an output temperature preferably equal or about equal to the coating temperature i.e. the temperature at which the strip has to be introduced in the hot dip coating section 5 given the coating that has to be done. Generally this temperature is about 460° C.

When the sheets are made of DP steel, the strip is introduced in the overaging section at a temperature generally between 650° C. and 700° C. but that can be between 550° C. and 700° C., and it is regularly cooled down to an output temperature preferably equal to the coating temperature. It can also be cooled at moderate cooling rate to the temperature of introduction in the overaging section then maintained at this temperature in all the overaging section then cooled down to the temperature of coating at a cooling speed which is preferably of at least 50° C./S for sheets having a thickness up to at least 2 mm.

When the sheets are made of TRIP steel, the strip is introduced in the overaging section at an overaging temperature generally around 450° C. or 460° C., or within the range of 400° C. to 460° C. and at the exit of the overaging preferably equal to the coating temperature and is maintained at this temperature or around it i.e. between the overaging temperature −10° C. and the overaging temperature +10° C. for a time generally between 20 s and 60 s.

When the sheets are made of Q&P steels, the strip is introduced in the overaging section at the overaging temperature obtained by the heating means of the first transfer section, and is maintained at or about at temperature i.e. between the overaging temperature −10° C. and the overaging temperature +10° C., for a time generally between 20 sec and 60 sec.

As previous said the overaging temperature is generally between 340° C. and 480° C. and preferably between 350° C. and 480° C. Moreover the difference between the overaging temperature and the quenching temperature must remain less than 330° C.

Generally, when the strip is then galvanized, the holding time at the overaging temperature is at least 30 s. When the strip is galvannealed, the holding time is preferably at least 45 s.

The length of the soaking furnace is adapted such that the holding time could be the specified time given the traveling speed of the strip in the line.

The second transfer section 4 comprises controllable cooling means 41 consisting for example in blowing boxes 411 able to cool the strip from an overaging temperature higher than the coating temperature down to the coating temperature i.e. between a temperature higher than 460° C. but less than 490° C. at a temperature between 450° C. and 460° C. for example. For some steels such as DP steels, the cooling means 41 have to be able to cool sheets having a thickness up to at least 2 mm, from a temperature between 550° C. and 700° C. at a cooling speed which is preferably of at least 50° C./s. In this case, if the cooling means are blowing boxes 411, these blowing boxes have to be able to make such cooling. These means cannot be used if no cooling is necessary.

The second transfer section 4 comprises also controllable rapid heating means 42 such as induction heater able to heat the strip from an overaging temperature less than the coating temperature to the coating temperature i.e. from a temperature less than 460° C. but higher than 340° C. to a temperature between 450° C. and 460° C. for example, or 400° C. to 460° C. These heating means do not have to be used if no heating is necessary.

The hot dip coating section 5 comprises at least a liquid metal bath 51, alloying means 52 and cooling means 53 which are known by those which are skilled in the art. It further comprises after-pot-cooling (or APC) sections 54, 55, also known by those which are skilled in the art.

The liquid metal bath is for example a bath of liquid zinc or liquid zinc alloy for galvanizing or galvannealing.

The alloying means is a furnace able to maintain the strip at an alloying temperature often between 480° C. to 570° C. and is used when the strip is galvannealed.

With this line, it is possible to achieve the thermal cycles corresponding to what is necessary to produce DP, TRIP or Q&P steel sheets. The diagrams temperature versus time of these cycles are shown in FIG. 2.

For a Q&P steel, the strip is heated in the annealing section 1, to annealing temperature AT between 795° C. and 910° C., and maintained 101 at this temperature. Then, in the first transfer section, the strip is rapidly cooled 102 down to a quenching temperature QT between 140° C. and 355° C. then reheated 102a or 102b to an overaging temperature between 340° C. and 490° C. Then, in the overaging section, the strip is maintained 103a or 103b at the overaging temperature which can be higher, lower or equal to the coating temperature.

Then, if the overaging temperature is not equal to the coating temperature, the strip is cooled 104a or heated 104b to the coating temperature.

The strip is coated by galvanizing 50, 50a or galvannealing 50, 50b.

For a TRIP steel, the strip is heated to an annealing temperature of between 830 and 870° C. and maintained at this temperature 201, in the annealing section 1, then it is cooled 202 in the first transfer section 2 to an overaging temperature of about 450° C. which is about the coating temperature. Then the strip is maintained 203 at this temperature in the overaging section 3 and pass through the second transfer section 4 without changing its temperature or by adjusting it if necessary. Then the strip is coated by galvanizing or galvannealing for example.

For a DP steel, in the annealing section 1, the strip is heated to an annealing temperature between 770 and 840° C. for example and maintained 301 at this temperature. Then the strip pass through the first transfer section 2, without heating and without forced cooling 302 in order to be introduced in the overaging section 3 at a temperature $T_{DP}$ between 650° C. or even 550° C. and 700° C. In an embodiment, in the overaging section, the temperature of the strip decreases regularly 303 down to the coating temperature. In the second transfer section, the temperature of the strip is adjusted if necessary. Then the strip is coated by galvanizing or galvannealing for example. In another embodiment, in the overaging section, the temperature of the strip is maintained 303' at the temperature $T_{DP}$ or about at this temperature. In the second transfer section 4, the sheet is cooled 304 at a cooling speed which is prefarbly of at least 50° C./s for all gauges up to at least 2 mm. Then the strip is coated by galvanizing or galvannealing for example.

It could be noticed that the hot dip coating is not necessarily zinc coating but can be of all type of hot dip metal coating.

As all the sections of the line are independently controllable, it is possible to produce successively on the same line various sheets made of TRIP steels, DP steels and Q&P steels.

The invention claimed is:

1. A multipurpose continuous processing line configured for heat treating and hot dip coating a steel strip, the multipurpose continuous processing line comprising:
   an annealing section configured for heating the steel strip to a predetermined annealing temperature and for maintaining the steel strip at the predetermined annealing temperature, the annealing section comprising a first controller;
   a first transfer section comprising a second controller and including, in sequence, a first cooling section and a first heating section;
   an overaging section able to maintain the steel strip at an overaging temperature between 300° C. and 700° C., the overaging section comprising a third controller;
   a second transfer section able to adjust the temperature of the steel strip to allow hot dip coating of the steel strip, the second transfer section including, in sequence, a second cooling section and a second heating section for adjusting the temperature of the steel strip by cooling or by heating, the second transfer section comprising a fourth controller; and
   a hot dip coating section for hot dip coating the steel strip at a coating temperature, the hot dip coating section comprising a fifth controller;
   the second cooling section cooling the steel strip to the coating temperature when the overaging temperature is higher than the coating temperature, the second heating section heating the steel strip to the coating temperature when the overaging temperature is lower than the coating temperature.

2. The multipurpose continuous processing line according to claim 1, wherein the first cooling section is controllable so cooling capabilities are adjustable between no cooling and rapid cooling to a predetermined quenching temperature and the first heating section is controllable so heating capabilities are adjustable between no heating and rapid heating to a predetermined overaging temperature.

3. The multipurpose continuous processing line according to claim 2, wherein the first cooling section includes a cooling speed that is adjustable between 0° C./s and 70° C./s, and the quenching temperature is adjustable between 100° C. and 500° C.

4. The multipurpose continuous processing line according to claim 2, wherein the first heating section includes at least one controllable induction heater.

5. The multipurpose continuous processing line according to claim 1, wherein the second cooling section is able to cool a sheet having a thickness up to 2 mm from a temperature between 550° C. and 700° C. to a hot dip coating temperature at a cooling speed which is at least 50° C./s.

6. The multipurpose continuous processing line according to claim 1, wherein the third controller maintains the temperature of the steel strip around the overaging temperature or makes the temperature of the steel strip decrease slowly between an entry temperature and an exit temperature.

7. The multipurpose continuous processing line according to claim 1, wherein the predetermined annealing temperature is adjustable between 700° C. and 1000° C.

8. The multipurpose continuous processing line according to claim 1, wherein the hot dip coating section includes a liquid metal bath.

9. The multipurpose continuous processing line according to claim 8, wherein the hot dip coating section further includes an alloying device for the coating.

10. The multipurpose continuous processing line according to claim 8, wherein the hot dip coating section is a galvanizing section or a galvannealing section.

11. A multipurpose continuous processing line for heat treating and hot dip coating a steel strip, the multipurpose continuous processing line comprising:
    an annealing section for heating the steel strip to a predetermined annealing temperature and for maintaining the steel strip at the predetermined annealing temperature, the annealing section comprising a first controller;
    a first transfer section including a second controller and, in sequence, a first cooling section and a first heating section;
    an overaging section able to maintain the steel strip at an overaging temperature between 340° C. and 480° C., the overaging section comprising a third controller;
    a second transfer section able to adjust the temperature of the steel strip to allow hot dip coating of the steel strip, the second transfer section including a fourth controller and, in sequence, a second cooling section and a second heating section for adjusting the temperature of the steel strip by cooling or by heating; and
    a hot dip coating section for hot dip coating the steel strip at a coating temperature, the hot dip coating section comprising a fifth controller;
    the second cooling section cooling the steel strip to the coating temperature when the overaging temperature is higher than the coating temperature, the second heating section heating the steel strip to the coating temperature when the overaging temperature is lower than the coating temperature.

* * * * *